June 2, 1942.   R. L. STREBINGER   2,285,310
BRAKE
Filed Jan. 11, 1940
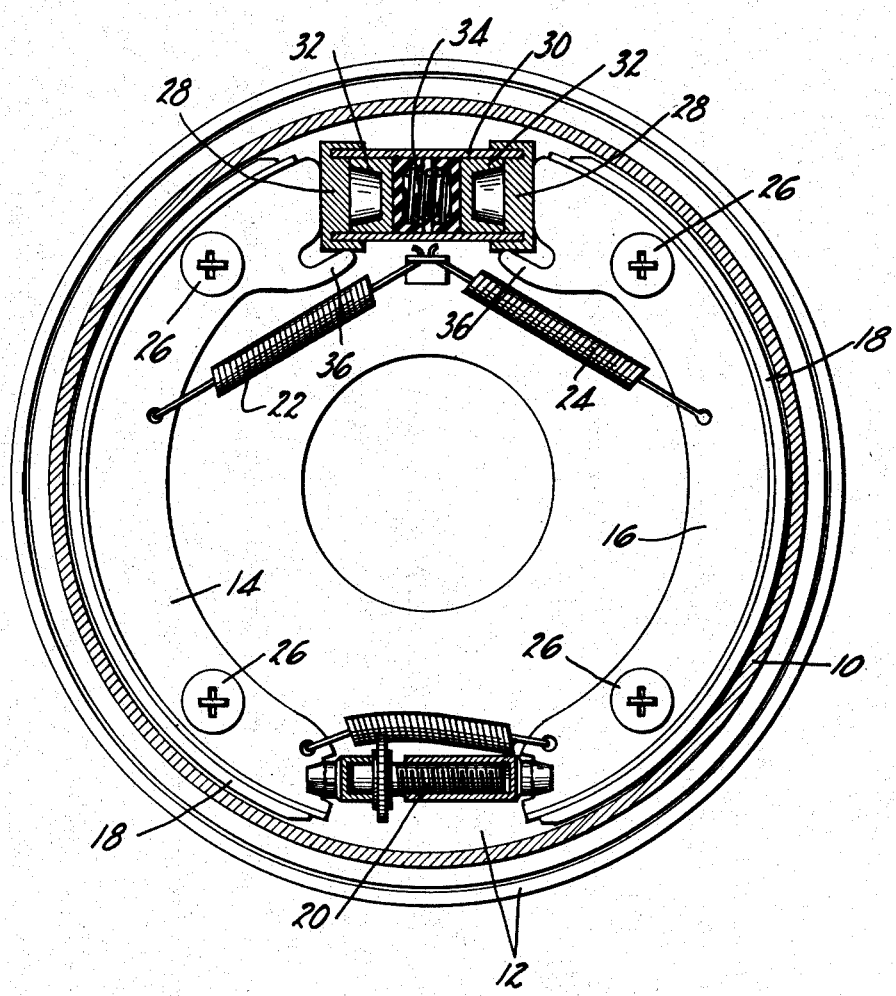
INVENTOR.
ROBERT L. STREBINGER
BY
*Jno. F. McConkey*
ATTORNEY.

Patented June 2, 1942

2,285,310

UNITED STATES PATENT OFFICE 2,285,310

BRAKE

Robert L. Strebinger, South Bend, Ind., assignor to Bendix Aviation Corporation, South Bend, Ind., a corporation of Delaware Application January 11, 1940, Serial No. 313,304

15 Claims. (Cl. 188—79.5)

This invention relates to brakes, and is illustrated as embodied in an internal expanding brake for an automobile.

An object of the invention is to provide simple and inexpensive positioning means for the brake shoes. Preferably the shoes have parts, which may be projections extending integrally from the ends of the webs, which position the shoes in released position, and which are distortable and take permanent "sets" as the brakes are applied after they have worn, to compensate for the wear.

The above and other objects and features of the invention will be apparent from the following description of the illustrative embodiment shown in the accompanying drawing, in which:

The figure is a section through the brake, in a plane just inside the head of the brake drum, and showing the brake shoes in side elevation.

The illustrated brake comprises a rotatable drum 10, at the open side of which is a support such as a backing plate 12. Within the drum are a pair of shoes 14 and 16, faced with brake lining 18, and connected by a suitable adjustable connection 20. The shoes are urged toward released position, and also radially upward, by return springs 22 and 24, and are provided with suitable steady rests 26.

One or the other of the shoes anchors, when the brake is applied, slidably against a cap 28 movably telescoped over the end of a wheel cylinder 30 fixed on the backing plate 12. Within the wheel cylinder are pistons 32, faced by sealing cups held by a spring 34. When pressure is applied from the brake pedal through the usual master cylinder and brake lines, one or the other of the pistons 32 forces its cap 28 outwardly to force the shoe 14 or 16 against the drum.

Each of the shoes includes a rim carrying the lining 18, and a web. At the upper end of each shoe the web is provided with a part such as an integral projection 36 which has enough "spring" to allow its shoe (when anchored) to shift outwardly against the drum. When the brake is released, the projections 36 position the heel ends of the shoes with a predetermined clearance from the drum.

When the lining 18 has worn excessively, however, so that this clearance increases, when the brake is applied the force on the anchored shoe distorts its projection 36 beyond its elastic limit, so it takes a permanent "set." Then when the brake is released again, the spring of the projection 36 again moves its shoe inwardly only far enough to give the heel of the shoe its original predetermined clearance.

The over-all length of the friction means comprising the shoes 14 and 16 may be increased by manipulation of the adjusting member 20. The distortion of the projections 36 serves to position the adjacent ends of the shoes with respect to the drum, while the adjustment accomplished by using the member 20 serves to position the ends of the shoes opposite the projections 36. There is a tendency when the anchor ends of the shoes are rigidly anchored for the shoe linings to wear in an extremely uneven manner. In such cases the point of greatest wear is likely to be near the end of the shoe opposite the anchoring end. In order to provide for substantially even wear of the lining from one end of the shoe to the other, it is desirable to provide means for repositioning both ends of the shoes as the brake lining wears. This result is accomplished in my brake by using the adjusting member 20 together with the projections 36. Since the anchored end of the shoe is allowed to move radially toward the drum whenever the associated member 36 has been sufficiently distorted, the lining adjacent the anchored end of the shoe will wear at approximately the same rate as the lining opposite the unanchored end of the shoe.

While one illustrative embodiment has been described in detail, it is not my intention to limit the scope of the invention to that particular embodiment, or otherwise than by the terms of the appended claims.

I claim:

1. A brake comprising an actuating cylinder constructed and arranged to serve as a brake anchor, and shoes arranged to anchor thereon and provided with parts engageable therewith in positions determining the positions of the ends of the shoes radially of the brake and which parts as the shoes wear are distorted when their respective shoes anchor under a braking load to maintain the clearance at the ends of the shoes.

2. A brake comprising a brake anchor, and shoes arranged to anchor thereon and provided with parts engageable therewith in positions determining the lengthwise positions of the shoes and which parts as the shoes wear are distorted when their respective shoes anchor under a braking load to maintain the clearance at the ends of the shoes.

3. A brake comprising an actuating cylinder constructed and arranged to serve as a brake anchor, and shoes arranged to anchor thereon and provided with parts engageable therewith in positions determining the positions of the shoes radially of the brake and which parts as the shoes wear are distorted when the shoes anchor under a braking load to maintain the clearance at the ends of the shoes, said shoes having rims and webs and said parts being integral with the webs.

4. A brake comprising a brake anchor, and shoes arranged to anchor thereon and provided with parts engageable therewith in positions determining the positions of the shoes radially of the brake and which parts as the shoes wear are distorted when the shoes anchor under a braking load to maintain the clearance at the ends of the shoes, said shoes having rims and webs and said parts being integral with the webs.

5. A brake comprising a shoe having a web formed at one end with a distortable projection, and a positioning device engaged by said projection and which distorts the projection when the brake is applied after excessive wear.

6. A brake comprising an actuating cylinder constructed and arranged to serve as a brake anchor, shoes arranged to anchor thereon and provided with parts engageable therewith in positions determining the positions of the shoes radially of the brake and which parts as the shoes wear are distorted when the shoes anchor under a braking load to maintain the clearance at the ends of the shoes, and adjusting means opposite the cylinder and between the ends of the shoes.

7. A brake comprising a brake anchor, shoes arranged to anchor thereon and provided with parts engageable therewith in positions determining the positions of the shoes radially of the brake and which parts as the shoes wear are distorted when the shoes anchor under a braking load to maintain the clearance at the ends of the shoes, and adjusting means between the ends of the shoes.

8. A brake comprising an actuating cylinder constructed and arranged to serve as a brake anchor, shoes arranged to anchor thereon and provided with parts engageable therewith to determine the positions of the ends of the shoes radially of the brake, said parts being subject to distortion when the shoes anchor under a braking load to maintain the clearance at the ends of the shoes, resilient means for holding the said parts against the anchor in released position of the shoes, and adjusting means opposite the cylinder and between the ends of the shoes for spreading the shoes to compensate for wear.

9. A brake comprising a brake anchor, a shoe arranged to anchor thereon and provided with a part engageable therewith to determine the position of one end of the shoe radially of the brake, said part being subject to distortion when the shoe anchors under braking load to maintain the clearance at the end of the shoe, resilient means holding the said part engaged with the anchor when the shoe is in released position, and adjusting means adjacent the other end of the shoe for moving the shoe to compensate for wear.

10. In a brake having a rotatable brake drum and an anchor member, the combination of a friction device shiftable to anchor at either end according to the direction of drum rotation, with means associated with the friction device at both ends thereof and subject to distortion when one of the ends of the friction device anchors to maintain the clearance between the anchoring end of the friction device and the brake drum.

11. A brake including a rotatable brake drum, a stationary anchor member, and a friction device which when applied to the drum anchors at one end or the other according to the direction of drum rotation, said friction device having parts engageable with the anchor member and subject to distortion when the friction device anchors under a braking load to maintain the clearance at the ends of the friction device.

12. A brake including a rotatable brake drum, a stationary anchor member, and a friction device which when applied to the drum anchors at one end or the other according to the direction of drum rotation, said friction device having parts engageable with the anchor member and subject to distortion when the friction device anchors under a braking load to maintain the clearance at the ends of the friction device, and said friction device comprising two brake shoes and an adjuster between the shoes for increasing the overall length of the friction device to compensate for shoe wear.

13. A brake comprising a rotatable drum, a stationary positioning member, a friction element which has lining subject to wear and which anchors on the positioning member at one end or the other according to the direction of drum rotation, means for adjusting the length of the friction element to compensate for wear, and parts associated with the friction element at the ends thereof and engageable with the stationary positioning member, said parts being subject to distortion under anchoring load to position the ends of the friction element relative to the brake drum.

14. A brake comprising a pair of cooperating friction elements at least one of which has lining the size of which is determined by wear, an adjuster for changing the length of the lined friction element to compensate for lining wear, and means for positioning the ends of the lined friction element including distortable parts integral with the said lined friction element and subject to distortion under the influence of braking force.

15. A brake comprising a pair of cooperating friction elements at least one of which has lining the size of which is determined by wear, an adjuster for changing the length of the lined friction element to compensate for lining wear, and means for positioning the ends of the lined friction element including distortable parts integral with the said lined friction element and subject to distortion under the influence of braking force, and including resilient means for determining the position of the said integral parts when the cooperating friction elements are not in contact with one another.

ROBERT L. STREBINGER.